United States Patent
Albrecht et al.

[11] 3,900,702
[45] Aug. 19, 1975

[54] RIBBON-SHAPED CONDUCTOR ARRANGEMENT FOR SUPERCONDUCTORS WHICH PERMITS EASE OF COOLING

[75] Inventors: Cord Albrecht, Erlangen; Hans Lamatsch, Nuremberg, both of Germany

[73] Assignee: Siemens Aktiengesellschaft, Munich, Germany

[22] Filed: Nov. 27, 1973

[21] Appl. No.: 419,232

[30] Foreign Application Priority Data
Nov. 30, 1972 Germany............................ 2258703

[52] U.S. Cl.......... 174/126 CP; 174/15 C; 174/128; 174/DIG. 6
[51] Int. Cl...................... H01v 11/00; H01b 5/00
[58] Field of Search.......... 174/DIG. 6, 15 C, 15 R, 174/126 R, 126 CP, 128, 117 F, 117 FF; 335/216

[56] References Cited
UNITED STATES PATENTS

| | | | |
|---|---|---|---|
| 3,332,047 | 7/1967 | Borchert | 174/DIG. 6 |
| 3,443,021 | 5/1969 | Schrader | 335/216 UX |
| 3,458,842 | 7/1969 | Zar | 174/128 X |
| 3,466,581 | 9/1969 | Albrecht et al. | 174/128 X |
| 3,470,508 | 9/1969 | Donadieu et al. | 335/216 |
| 3,514,730 | 5/1970 | Kassner | 335/216 |
| 3,548,078 | 12/1970 | Albrecht et al. | 174/DIG. 6 |
| 3,550,050 | 12/1970 | Albrecht | 174/128 X |
| 3,657,466 | 4/1972 | Woolcock et al. | 174/128 X |
| 3,737,824 | 6/1973 | Coles | 174/DIG. 6 |

FOREIGN PATENTS OR APPLICATIONS 2,008,009  9/1970  Germany ..................... 174/DIG. 6

Primary Examiner—Arthur T. Grimley
Attorney, Agent, or Firm—Kenyon & Kenyon Reilly Carr & Chapin

[57] ABSTRACT

An improved type of ribbon-shaped conductor made up of a plurality of individual conductors of normal conducting metal arranged side-by-side and welded together, some of which conductors have embedded superconductors wherein the individual conductors not containing superconductors are arranged so as to have at least portions thereof of a different thickness than the individual conductors containing superconductors whereby when the overall ribbon-shaped conductor is installed with one layer of this conductor over another, cooling ducts are formed which result in improved cooling of the superconductors.

11 Claims, 2 Drawing Figures

RIBBON-SHAPED CONDUCTOR ARRANGEMENT FOR SUPERCONDUCTORS WHICH PERMITS EASE OF COOLING

BACKGROUND OF THE INVENTION

This invention relates to ribbon-shaped conductors which contain superconductors therein and more particularly to an improved arrangement for such conductors which results in improved cooling thereof.

A type of ribbon-shaped conductor exists in which a plurality of individual conductors, at least some of which have embedded therein superconductors, are arranged side-by-side and mechanically connected such as by welding. As is well known, such measures are necessary in case the superconductors become normal conducting. In that case, the normal conductor in which they are embedded provides the capability for carrying the increased normal current without overheating or burn-up of the thin superconductors. Superconductors arranged in this manner are known as stabilized superconductors with the term full-stabilization being used to denote a normal conductor having the capability of carrying the full current should normal conduction occur.

In one known embodiment of such ribbon-shaped conductors the normal conductors which contain the superconductors are interspersed with individual conductors which consist of electrically normal conducting metal without superconductors. The purpose of the inclusion of such individual conductors which are made of a strong metal such as stainless steel is to provide structural reinforcement. Ribbon conductors of this nature are vary often used in superconducting magnets where the conductor is arranged in a winding in which ribbons of the layer lie one on top of the other. As is well known, the superconductors must be kept cooled down to a superconducting temperature during normal operation and in addition, must be capable of being further cooled in the case of normal conduction occuring and the resulting increase in temperature. Thus, in an arrangement such as this provisions for adequate cooling must be provided. With the presently known types of superconductor ribbon conductors of the type described above, special measures must be taken to ensure that adequate coolant flow can be established in an arrangement of such ribbon-shaped conductors. Thus, there is a need for constructing these ribbon-shaped conductors such that adequate cooling is provided in a simple manner without the need for special provisions.

SUMMARY OF THE INVENTION

The present invention provides a ribbon-shaped conductor which as a whole, is more transparent to the flow of coolant. This characteristic is even more apparent when the ribbon-shaped conductor is wound as part of a magnet coil. This is accomplished by forming the superconductor so at least portions of the individual normal conductors which do not contain superconductors therein have a thickness or height different from adjacent normal conductors containing the superconductors. The result is that when the ribbon-shaped conductor is wound in layers, spaces or ducts are formed through which coolant may easily flow. Thus, the arrangement of a ribbon-type superconductor of this nature achieves both good cooling and good stabilization of the superconductors.

Various embodiments of the present invention are illustrated. In one embodiment, spacers either of a conducting or insulating material are attached at various points on the normal conducting individual conductors which do not have the superconductors embedded therein. Furthermore, the individual conductors can have the spacers formed therein by making the individual conductor without superconductors thicker than the individual conductors containing superconductors and then machining out channels in the second conductor with the depth of the channel essentially equal to the increased thickness. The use of spacers of insulating material is particularly advantageous since such use will alleviate the need for additional electrical insulation between the individual layers of the ribbon-shaped conductors when wound on a superconducting magnet.

The spacer elements need not be as wide as the width of the individual conductor on which they are placed. Since the individual conductor is welded to an adjacent individual conductor, a weld-seam which is above the surface of the conductor will normally be present. The use of smaller spacers thus, avoids the need for machining or other working of the seams in order that the spacer may lie flat on the conductor.

In a further embodiment, the individual conductors not having superconductors embedded therein, are made of a smaller thickness than the individual conductors containing superconductors. This immediately forms channels through which coolant can flow extending over the full longitudinal direction of the ribbon-shaped connectors. With such a construction, it is advantageous to bevel the edges of the adjacent individual conductors in order to facilitate making an electron-beam weld between the two individual conductors.

Also shown are cut-outs in the individual conductors which do not contain superconductors. This increases the transparency of the arrangement to the flow of coolant, particularly in a direction perpendicular to the flat sides of the ribbon-shaped conductor. Such an arrangement materially increases the cooling and stabilization of the superconductors in a magnet arrangement. Rather than making cut-outs, the individual conductors not containing the superconductors can be arranged so that their end faces are spaced from each other. That is, the individual conductor over an extended length of the ribbon-shaped conductor will be made up of a plurality of elongated conductors, which are normally butted and possibly welded together. To obtain increased cooling, rather than butting these elongated conductors together when assemblying the ribbon-shaped conductor, they can be spaced so that their ends do not meet, thereby forming a gap through which coolant can flow.

Preferably the width of the individual conductors which do not contain superconductors will be smaller than the width of the individual conductors in which said superconductors are embedded. A design of this nature, allows the overall width of the ribbon-shaped conductor to become smaller while still having the same current carrying capacity.

DETAILED DESCRIPTION OF THE PREFERRED EMBODIMENT

Figure 1:
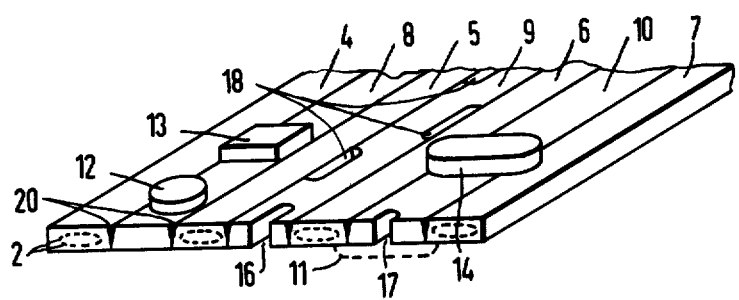
FIG. 1 is a perspective cross-sectional view illustrating embodiments of the invention wherein spacers are used and also illustrating cut-outs.

FIG. 1 illustrates a ribbon-shaped conductor made up of the individual conductors 4, 5, 6, 7, 8, 9 and 10. The individual conductors 4, 5, 6 and 7 are conductors which have embedded therein a plurality of thin superconducting wires indicated by the reference numeral 2. These may be twisted or not twisted in conventional fashion. Preferably these four individual conductors will be made in a fully stabilized design of aluminum or copper. The remaining three individual conductors 8, 9 and 10 which are placed between the conductors 4, 5, 6 and 7 will comprise a normally conducting metal preferably stainless steel [i.e., $V_2A$ steel.] As noted above, these stainless steel strips act to reinforce the entire conductor strip and are commonly referred to as reinforcing strips. In addition, they increase the transversal resistance of the overall conducting ribbon thereby reducing transversal currents and the losses associated therewith. The conductors are connected to each other through welding, preferably electron beam-welding with welds thereon indicated by the reference numeral 20. The welded seams are produced by a welding beam directed onto the upper contact edge between two individual conductors and extend only over a portion of the thickness of the conductor ribbon.

Various forms of spacer elements are illustrated on FIG. 1, which spacers, as indicated above, serve to separate layers of the ribbon when wound on a magnet coil or the like and aid in the flow of coolant. Thus, there is shown a spacer element 12 of circular cross-section and a spacer element 13 of square or rectangular cross-section. These spacer elements may be of a conducting material and can be spot-welded to the individual conductor 8 or other individual conductors. As noted above, their size can be such that their width is less than that of the individual conductor 8 thereby avoiding any need to machine down the welded seams 20. Also shown is a spacer 14 having an oval shape which overlaps the individual conductors 6 and 7 which contains the superconducting wires 2. This spacer may, for example, be of an insulating material. In such a case, it can be secured to the individual conductor 10 through the use of a hole or slot such as the slot 17 shown on the end of conductor 10 and a stem extending from the bottom of the spacer 14. The hole and stem can be sized so that a press fit is possible. Also shown in dotted lines under the slot 17 is a spacer indicated by the reference numeral 11. This illustrates that spacers may be placed on both sides of the conductor if desired. The use of insulating material for spacers such as 14 avoids the need for additional insulation between layers. In addition, since the material is insulating, the overlapping of more than one conductor will not cause transversal currents to flow as would be the case if the spacers 12 or 13 were allowed to overlap. Thus, spacers such as this can extend across relatively wide portions of the ribbon-shaped conductor without increasing its transversal resistance. In addition there is illustrated on FIG. 1 cutouts 16 and 18 which may be provided to aid in flow of coolant in a transverse direction.

Figure 2:
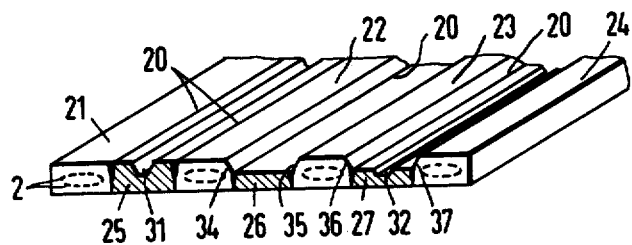
FIG. 2 illustrates is a similar view illustrating further embodiments wherein the conductors without superconductors embedded therein are made of a different thickness than the adjacent individual conductors containing superconductors.

FIG. 2 illustrates further embodiments of the invention. In the manner described above, reinforcing strips of stainless steel or other similar material and designated 25, 26 and 27 are welded between individual conductors 21, 22, 23 and 24 containing superconducting wires 2. As in the embodiment above, these individual conductors containing the superconductor wires will preferably be made so as to fully stabilized the superconductors and will be made of a material such as aluminum or copper. As in the embodiment above, the individual conductors are connected to each other with electron-beam welds 20. The reinforcing strip 25 illustrates an embodiment in which a cooling groove 31 is cut. Such a groove runs throughout the longitudinal direction of the reinforcing strip 25. The reinforcing strip 26 is made thinner than the adjacent individual conductors 22 and 23 so that when the ribbon-shaped conductors are placed one over the other a channel through which coolant can flow is formed. The reinforcing strip 27 is essentially the same as strip 26 with the exception that an additional cooling groove 32 is formed therein similar to cooling groove 31. It is also possible to make a reinforcing strip such as strip 25 thicker than the adjacent conductors 21 and 22 so that ducts are formed over the individual conductors 21 and 22 with additional coolant being allowed to flow through these ducts.

In embodiments where differences in the thickness of the conductors is used, such as the arrangement between the reinforcing strip 26 and the individual conductors 22 and 23 it is preferably that the conductors of greater thickness be bevelled with a bevel 34 or 35 as shown to provide an unimpeded path for the electron beam used to weld the individual conductors together. Similar bevels 36 and 37 are shown on the individual conductos 23 and 24. As shown in FIG. 1, cutouts may also be provided in the reinforcing strips of FIG. 2.

Thus, an improved ribbon-shaped conductor of the type made up of individual conductors, at least some of which contain superconductors has been shown. Although a specific embodiment has been illustrated and described, it will be obvious to those skilled in the art that various modifications may be made without departing from the spirit of the invention which is intended to be limited solely by the appended claims.

What is claimed is:

1. In a ribbon-shaped conductor which comprises a plurality of individual conductors made of electrically normal conducting metals which are arranged side-by-side and welded together, with some but not all of the individual conductors having embedded therein superconductors wherein the improvement comprises forming at least some of the individual conductors not containing superconductors so that at least portions of said individual conductors are of a different thickness than that of the individual conductors containing said superconductors.

2. The invention according to claim 1 wherein at least some of said individual conductors which do not have superconductors embedded therein have spacer elements placed thereon.

3. The invention according to claim 2 wherein said spacer elements are electrically conductive.

4. The invention according to claim 3 wherein the width of said spacer element is less than the width of the individual conductor on which said spacer elements are placed.

5. The invention according to claim 1 wherein said spacer elements are of an electrically insulating material.

6. The invention according to claim 1 wherein said individual conductors not having superconductors embedded therein, have at least a strip shaped portion extending in the longitudinal direction which is of a thickness different than the thickness of said individual conductors having superconductors embedded therein.

7. The invention according to claim 6 wherein said individual conductors not having superconductors therein are thinner than said individual conductors having superconductors embedded therein and wherein said individual conducts having superconductors embedded therein are bevelled at the point where they meet said individual conductors not having superconductors therein.

8. The invention according to claim 6 wherein said individual conductors not having superconductors therein are thicker than said individual conductors having superconductors embedded therein and wherein said individual conductors not having superconductors therein are bevelled at the point where they meet said individual conductors having superconductors embedded therein.

9. The invention according to claim 1 wherein said individual conductors not having superconductors embedded therein are provided with cutouts.

10. The invention according to claim 1 wherein each individual conductor not having superconductors embedded therein comprises a plurality of elongated conductors extending one-behind the other in said ribbon shaped conductor, the end faces of adjacent elongated conductors spaced from each other, whereby slots are formed through said ribbon-shaped conductors.

11. The invention according to claim 1 wherein the width of said individual conductors not having superconductors embedded therein is less than the width of the individual conductors having superconductors embedded therein.

* * * * *